United States Patent Office 2,997,367
Patented Aug. 22, 1961

2,997,367
DEFLUORINATION OF PHOSPHATIC MATERIAL
William B. Williams, Evanston, Ill., assignor to International Minerals & Chemical Corporation, a corporation of New York
No Drawing. Filed Oct. 22, 1956, Ser. No. 617,257
4 Claims. (Cl. 23—109)

This invention relates to the defluorination of natural phosphate materials. Still more particularly, it relates to the manufacture of defluorinated phosphates useful as animal feed or animal feed supplement providing both needed phosphorus and calcium. Still more particularly, it relates to the manufacture of defluorinated tricalcium phosphate.

Mineral phosphates of all the natural deposits in the United States and in most foreign countries occur in the form of apatite containing too much fluorine to permit their use as feed material without processing to reduce the content of objectionable fluorine from an original approximately 3.0 to about 3.8% to below about 0.13% in a phosphate feed containing about 30% $P_2O_5$.

This fluorine content of the natural phosphate rocks has, in the past, been reduced by mixing the rock with additives such as sulfuric acid, phosphoric acid, silica and the like, and calcining the mixtures to drive off the fluorine.

Among the patents teaching calcination is Butt, No. 2,442,969. In this patent, phosphate rock is mixed with phosphoric acid and calcined to defluorinate. The calcined product, while very low in fluorine content, has a very low citrate solubility.

Another patent Tromel, No. 2,093,176, prepares mixes of phosphate rock with sulfuric acid, etc. and silicic acid which are calcined and fused. These mixtures are low in phosphorus content and like Butt's products, have low citrate solubility.

In still another patent, Ritter, No. 2,337,498, mixes are prepared by adding only an amount of phosphoric acid sufficient to convert free lime to tricalcium phosphate, and 0.5 mole of alkali for each mole of $P_2O_5$ and calcined. This mixture is calcined at temperatures of 1100° to 1400° C. This product is low in phosphorus content, i.e., about 15.5 to 16.5% P, and requires uneconomically large amounts of soda ash to produce products of less than 0.1% fluorine.

It is a primary object of this invention to overcome the shortcomings and disadvantages of processes heretofore in use.

It is an object of this invention to provide a process which, with relatively small additions of soda ash, gives a product meeting the industries requirements for a product of less than 0.1% F in products of at least 30% $P_2O_5$, and high ammonium citrate solubility.

It is another object of this invention to provide a method of defluorinating calcium phosphates wherein the defluorination is accomplished in two stages, the first stage being under calcining conditions which do not require the extreme operating care necessary in previous processes and a second stage which completes defluorination and converts the $P_2O_5$ into tricalcium orthophosphate form desirable for animal feed supplements.

It is still another object to provide a process wherein the phosphates are converted to substantially 100% citrate soluble $P_2O_5$.

These and other objects will be apparent to those skilled in the art from the following description.

In the process of this invention, phosphate rock and mole ratio balancing salts such as oxygen-bearing salts of calcium and/or volatile anion salts of alkali metals are mixed with phosphoric acid so that in the final product the mole ratio represented by the following formula is between 3.0 and 3.8.

$$\frac{\text{Moles}}{\text{Moles}} = \frac{CaO + MgO + Na_2O + K_2O - SO_3 - F_2}{P_2O_5 - Fe_2O_3 - Al_2O_3}$$

where the amounts of the substances are expressed in moles (computed in each instance by dividing the total weight of each substance by its molecular weight. Acidic constituents such as $SO_3$ and $F_2$ are subtracted from the moles of CaO and other alkaline constituents as indicated by minus signs.

Preparatory to the first stage of heat treatment, the phosphate rock and alkali salts are mixed with phosphoric acid. The acid in the form of aqueous solution of suitable concentration is intimately mixed with the rock in a pug mill, drum tumbler, clay mill, and like suitable apparatus. The quantity of acid will vary depending upon the desired $P_2O_5$ content and the quantities of lime and/or alkali metal material also being added.

With rock containing 3% or more of fluorine, effective defluorination, i.e., reduction of fluorine content to about 0.4% or less, can be effected with a calcining temperature of about 2200° F. and a retention time at temperature of about 10 minutes when the material has a mole ratio in the range between about 3.0 and about 3.8. Higher temperatures and longer retention time in the calciner reduces the fluorine content further.

Addition of volatile anion salts of alkali metals in the proper proportions such as to give an alkali metal oxide to $P_2O_5$ mole ratio between about 0.2:1 and about 0.6:1 have a marked effect upon the defluorination of mixtures. For mixtures of the same calculated mole ratio of ingredients calcined with the same water vapor content gases, in contact with the solids, increase in alkali metal salt content reduces the fluorine content of the calcined product as much as 10 fold. Addition of alkali metal salt is most effective when calcining the more difficult to deflorinate mixtures, i.e., those with a higher calculated mole ratio. Addition of sufficient alkali metal salt to give an alkali metal oxide/$P_2O_5$ mole ratio in the above range improves the defluorination and the P/F weight ratio of the product of the calcining step. For a mixture of mole ratio of 3.5, calculated according to the above formula, increasing the $Na_2O/P_2O_5$ from substantially zero to 0.27:1 improves the P/F of the calcined product about 10 fold, i.e., from approximately 15 to approximately 190 when 10% water vapor is present in the gaseous medium contacting the solids during calcining.

Alkali metal oxide/$P_2O_5$ mole ratio also has a marked effect on the citrate solubility of the $P_2O_5$ content of the products. Products of the same calculated mole ratio, for example 3.1, show markedly increased percentages of the total $P_2O_5$ which are citrate soluble when the alkali metal to $P_2O_5$ mole ratio is increased above about 0.2 to about 0.6. At an alkali metal oxide/$P_2O_5$ mole ratio of substantially zero, a mix of calculated mole ratio of 3.5 and calcined at 2500° F. shows about 20% citrate solubility. At an alkaline metal oxide/$P_2O_5$ mole ratio of 0.3, the citrate solubility after calcining is about 88%. At a ratio of 0.6 a citrate solubility of about 95% to 100% is obtained. When mixtures of higher calculated mole ratio, for example, 3.5, are heat treated, amounts of added alkali giving low alkali metal to $P_2O_5$ mole ratio of the order of 0.2 show similar response to that obtained with an alkali metal mole ratio to $P_2O_5$ of 0.3 for mixtures of 3.1 calculated mole ratio.

Alkali metal salts added to the mix may be soda ash, sodium sulfate, sodium nitrate, sodium formate, sodium chloride, potassium carbonate, potassium sulfate, and the like.

Calcium-bearing additions may be lime, limestone, calcium nitrate, calcium formate, and the like.

Mixtures balanced to have a mole ratio in the above range is fed to a calciner such as a rotary kiln for the first treatment. The calciner may be of the type where the hot combustion gases and the flame of the burner are directed into the product discharge end of the kiln or the heating may be of the indirect type. The mixture during the calcining is maintained, if there is to be effective defluorination, in an atmosphere containing water vapor. Such atmosphere may be created by injection of either steam or water into preferably the flame end of the calciner or by use of a fuel of sufficient hydrogen content so as to produce the desired vapor content in the combustion products.

By this method, a mix is prepared balanced as to the mole ratio of alkali metal oxide/$P_2O_5$ which can be defluorinated despite the high calculated mole ratio and the alkali metal oxide/$P_2O_5$ ratio is maintained sufficiently high to give high ammonium citrate solubility of the phosphate product and high ortho $P_2O_5$ content to the fused product.

In this first stage, conducted preferably at a temperature in the range of about 1800° F. to about 2700° F., preferably at about 2100° F. to about 2300° F., a substantial amount of fluorine is removed from the phosphate material but insufficient to render it acceptable as an animal feed and without materially improving its availability as a fertilizer or an animal feed. This calcining operation with its agitation, granulates or nodulizes the product making for a free-flowing material without any fusion of the charge.

The calcined material produced in the first heat treatment stage is subjected to a temperature above its melting or fusion point in any suitable apparatus for high temperature heating such as an electric furnace, either induction or direct arc, or an oil or gas-fired shaft or reverberatory furnace or the like. The temperature must be sufficiently high to render the calcined material molten, i.e., 2700° F. to about 3000° F. Maintenance of the material in the molten state and in an atmosphere containing water vapor completes the fluorine evolution and converts the phosphate to the alpha form.

The molten material is withdrawn from the heating apparatus in any suitable manner, as by gravity, or by means of applied pneumatic pressure. The material may be withdrawn in the form of a small tap hole stream or if pressure is employed, it may be sprayed or atomized from the melting furnace.

Upon removal of the molten phosphate from the furnace, a rapid cooling or quenching is effected to maintain the material in the alpha crystalline form. The molten material if allowed to air-cool contains a markedly lower percentage of $P_2O_5$ in the desirable alpha form. This quenching should reduce the material to a temperature of 900° F. or below.

The quenching of this material may be accomplished in any suitable manner. One method is to direct a stream of molten material into a large body of water. A second method of quenching is to direct a jet or plurality of jets of water into the stream of molten material.

Typical percentage analyses of the raw material and of the final product produced using sodium carbonate are as follows:

| | Florida Rock, 77 B.P.L. | Final Product |
|---|---|---|
| $SiO_2$ | 5.5 | Not Det. |
| $K_2O$ | .1 | .1 |
| $Na_2O$ | .2 | 7.1 ($Na_2O/P_2O_5$ 0.38) |
| $SO_3$ | .5 | .05 |
| $CaO$ | 49.4 | 43.1 |
| $MgO$ | .20 | .25 |
| Total $P_2O_5$ | 34.5 | 43.0 |
| Citrate Soluble $P_2O_5$, percent of total | | 96.7 |
| $Fe_2O_3$ | 1.1 | 1.5 |
| $Al_2O_3$ | 1.2 | 1.1 |
| $CO_2$ | 3.2 | Not Det. |
| F | 3.9 | P/F 1,000 |
| $H_2O$ at 105° | .70 | None |
| Mole Ratio | | 3.10 |

Total $P_2O_5$ content of the products was determined in accordance with the Methods of Analysis for Fertilizer established by the Association of Official Agricultural Chemists as shown in the 6th Edition, 1945, page 21.

The orthophosphate content of products was determined as follows:

Weigh .4 gram sample into 600 ml. beaker, add 400 ml. .4% HCl.[1] Stir for 2 hrs. in water bath, 98–99° F. Transfer to a 500 ml. volumetric flask, cool and make to volume. Shake to mix and filter on dry filter. Pipette two 50 ml. samples into 250 ml. beakers. Add 50 ml. of ammonium nitrate at room temperature to first sample, then place on stirring rack. While stirring, add 50 ml. of ammonium molybdate solution and stir for 40 minutes. After sample #1 has been stirring for 20 minutes, repeat above procedure on sample #2 stirring it only 20 minutes so that two samples finish stirring at same time. Filter thru asbestos pad, wash six times with distilled $H_2O$, place sample back in beaker and titrate as for ordinary $P_2O_5$ sample.

($P_2O_5$ in #2) — ($P_2O_5$ in #1 — $P_2O_5$ in #2) = ortho $P_2O_5$

In order to give a fuller understanding of the invention, but with no intention to be limited thereto, the following specific example is given to illustrate the character of the invention herein described.

*Example*

A Florida phosphate rock containing about 35% $P_2O_5$ was ground to a size such that all of it passed through a 100 mesh standard screen. To 1000 parts by weight of this comminuted rock was added about 200 parts by weight of 54% $P_2O_5$ phosphoric acid and 115 parts by weight of soda ash. From this mixture a final product is obtainable having a mole ratio calculated according to the formula of about 3.2 and a $Na_2O/P_2O_5$ mole ratio of about 0.35.

The ingredients are mixed until uniform distribution of acid and salts is effected following which the material may be either sent directly to a calciner or to a storage pile. The material is ground so that it will all pass through a 6 mesh screen.

Ground mix is heat-treated in a rotary kiln of the lime-burning counterflow type at a temperature of 2400° F. with an atmosphere containing approximately 10 mole percent $H_2O$.

The nodulized material discharged by the kiln was fed to a hopper and from there into a shaft furnace where the material is fused to a molten mass.

A small molten stream tapped from the furnace discharges into a large volume of water and was cooled to a temperature of about 300° F.

The quenched product after cooling to atmospheric temperature was ground and its orthophosphate content determined as explained above. The analyses showed

[1] Approx. 36.3 ml. conc. HCl in 4 liters $H_2O$.

95% total $P_2O_5$ as citrate soluble and 99% of $P_2O_5$ to be present in the orthophosphate form, with a P/F weight ratio of about 2000.

Having thus described my invention, what I claim is:

1. The improved process for producing an animal feed ingredient containing less than 0.18% fluorine which comprises mixing comminuted phosphate rock with phosphoric acid, with a sufficient amount of at least one substance selected from the group consisting of limestone, calcium nitrate, calcium formate, and alkali metal salts having an anion selected from the group consisting of carbonate, sulfate, formate and chloride, so that for the final product the mole ratio represented by the following formula is between 3.0 and 3.8

$$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is between about 0.2 and about 0.6 and calcining the mixture at a temperature above about 1900° F. without substantial fusion and while actively agitating the same, and heating the alkali metal salt containing mixture to a temperature of at least about 2700° F. and above the fusion temperature and thereafter recovering the animal feed ingredient containing less than 0.18% fluorine.

2. The improved process for producing an animal feed ingredient containing less than 0.18% fluorine which comprises mixing comminuted phosphate rock with phosphoric acid, with a sufficient amount of at least one substance selected from the group consisting of limestone, calcium nitrate, calcium formate, and alkali metal salts having an anion selected from the group consisting of carbonate, sulfate, formate and chloride so that for the final product the mole ratio represented by the following formula is between 3.0 and 3.8

$$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is between about 0.2 and about 0.6 and calcining the mixture at a temperature above about 1900° F. without substantial fusion and while actively agitating the same, heating the calcined product to a molten condition at a temperature of at least about 2700° F., and quenching the molten product to a temperature less than about 900° F. to recover an animal feed ingredient containing less than 0.18% fluorine.

3. The improved process for producing an animal feed ingredient containing less than 0.18% fluorine which comprises mixing comminuted phosphate rock with phosphoric acid and with a sufficient amount of at least one substance selected from the group consisting of lime, limestone, calcium nitrate, calcium formate, and alkali metal salts having an anion selected from the group consisting of carbonate, sulfate, formate, and chloride, so that for the final product the mole ratio represented by the following formula is between 3.0 and 3.8

$$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is between about 0.2 and about 0.6, calcining the mixture at a temperature within the range between about 1900° F. and about 2700° F. without substantial fusion and while actively agitating the same, heating the calcined mixture to a temperature above the fusion temperature of the mixture and within the range between about 2700° F. and 3000° F., whereby the mixture is fused, and quenching the fused mixture to recover an animal feed ingredient containing less than 0.18% fluorine.

4. The improved process for producing an animal feed ingredient containing less than 0.18% fluorine which comprises mixing comminuted phosphate rock with phosphoric acid, lime and soda ash so that for the final product the mole ratio represented by the following formula is between 3.0 and 3.8

$$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is between about 0.2 and about 0.6 and calcining the mixture at a temperature above about 1800° F. without substantial fusion and while actively agitating the same, heating the alkali metal salt containing mixture to a temperature of at least about 2700° F. and above the fusion temperature and thereafter recovering the animal feed ingredient containing less than 0.18% fluorine.

References Cited in the file of this patent
UNITED STATES PATENTS

| | | |
|---|---|---|
| 2,442,969 | Butt | June 8, 1948 |
| 2,556,541 | Hollingsworth | July 12, 1951 |
| 2,562,718 | Hollingsworth | July 31, 1951 |
| 2,839,361 | Hollingsworth | June 17, 1958 |